US 6,543,299 B2

(12) United States Patent
Taylor

(10) Patent No.: US 6,543,299 B2
(45) Date of Patent: Apr. 8, 2003

(54) PRESSURE MEASUREMENT SENSOR WITH PIEZORESISTIVE THREAD LATTICE

(76) Inventor: Geoffrey L. Taylor, 120 Maryland Street, Winnipeg, Manitoba (CA), R3G 1L1

( * ) Notice: Subject to any disclaimer, the term of this patent is extended or adjusted under 35 U.S.C. 154(b) by 0 days.

(21) Appl. No.: 09/891,185

(22) Filed: Jun. 26, 2001

(65) Prior Publication Data

US 2002/0194934 A1 Dec. 26, 2002

(51) Int. Cl.$^7$ ................................................ G01D 7/00
(52) U.S. Cl. ................................................ 73/862.046
(58) Field of Search ............... 73/862.046, 862.041, 73/862.042, 862.043, 862.044, 862.045

(56) References Cited

U.S. PATENT DOCUMENTS

| 4,843,891 | A | * | 7/1989 | Brunner et al. | 73/862.046 |
|---|---|---|---|---|---|
| 5,033,291 | A | * | 7/1991 | Podoloff et al. | 73/172 |
| 5,083,467 | A | * | 1/1992 | Tabota | 73/862.046 |
| 5,429,006 | A | * | 7/1995 | Tamori | 382/124 |
| 6,155,120 | A | * | 12/2000 | Taylor | 73/862.046 |
| 6,216,546 | B1 | * | 4/2001 | Bahr | 73/862.041 |

* cited by examiner

*Primary Examiner*—Max Noori
(74) *Attorney, Agent, or Firm*—William L. Chapin

(57) ABSTRACT

A transducer sensor array for measuring forces or pressures exerted on a surface includes a lattice of individual force or pressure sensor transducer elements comprising intersecting regions of pairs of elongated, flexible threads, each consisting of a central electrically conductive wire core covered by a layer of piezoresistive material having an electrical resistivity which varies inversely with pressure exerted on the material. The threads are arranged into two parallel planar sets, one set forming parallel spaced apart rows and the other set forming parallel spaced apart columns angled with respect to the rows. Row and column piezoresistive threads are retained in physical contact with one another at crossover intersection points forming a lattice of piezoresistive junctions comprising individual force sensing elements, either by being bonded between a pair of thin, flexible, upper and lower laminating sheets, or by being interwoven to form a fabric mesh. In either case, the sensor array formed by the piezoresistive threads has a highly flexible, fabric-like characteristic which enables the array to readily conform to irregularly curved object surfaces. External normal forces or pressures exerted on an upper surface of the array placed on an object surface causes the electrical resistance of piezoresistive junctions which are compressed in response to the external forces to vary in a predetermined way, enabling a two-dimensional plot of electrical resistance values of each junction node to be made, thus enabling a two-dimensional matrix or map of pressure values exerted on each point of a surface, overlain by the sensor array to be generated. In one embodiment, the piezoresistive layer covering each piezoresistive thread consists of an electrically conductive elastomer, such as silicone rubber impregnated with carbon particles. In another embodiment, the piezoresistive threads consist of a wire core spirally wrapped with a plurality of thin polymer filaments that have a relatively poor electrical conductivity, such as nylon fibers which have carburized outer surfaces.

43 Claims, 7 Drawing Sheets

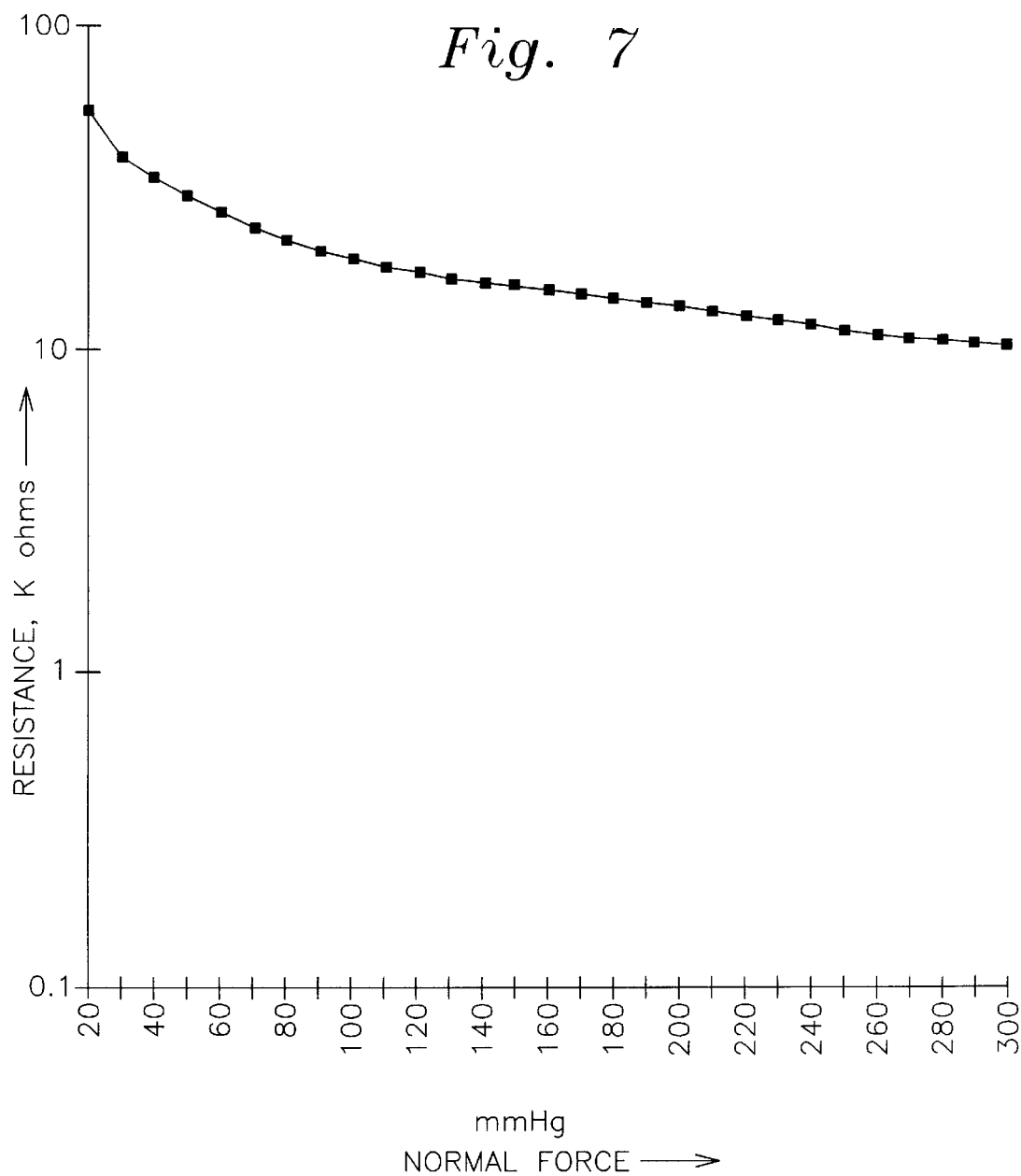

PRESSURE MEASUREMENT SENSOR WITH PIEZORESISTIVE THREAD LATTICE

BACKGROUND OF THE INVENTION

A. Field of the Invention

The present invention relates to transducers, apparatus and methods used for measuring forces exerted on a surface. More particularly, the invention relates to a novel force sensor array for pressure measurement and mapping which includes a fabric-like lattice of piezoresistive threads that are arranged in rows and columns, intersecting pairs of which conductively contact one another to form individual piezoresistive force sensing elements.

B. Description of Background Art

There are a wide variety of situations in which it would be desirable to measure normal forces exerted at discrete points on a surface, using such measurements, for example, to produce a map of pressures exerted on various portions of the surface by an object. Examples of such applications for utilizing pressure maps are given in the present inventor's U.S. Pat. No. 5,571,973, Nov. 5, 1996, *Multi-Directional Piezoresistive Shear And Normal Force Sensors For Hospital Mattresses And Seat Cushions*. In that patent, the present inventor disclosed thin, planar sensors for measuring reaction forces exerted by mattresses or chair pads on the body of a recumbent or seated patient. One embodiment of the invention disclosed in the specification of the '973 patent includes a sensor comprised of a two-dimensional array of isolated sensor element pads, each consisting of a thin, flat layer formed of a non-conductive elastomeric polymer matrix filled with electrically conductive particles. A matrix of upper and lower conductive elements in electrical contact with upper and lower sides of each sensor pad enables separate measurements to be made of the electrical resistance of each pad. Pressure exerted on each pad, e.g., in response to a normal force exerted on the sensor matrix by a person's body, reduces the thickness of the sensor pad, and therefore its electrical resistance, by a bulk or volume piezoresistive effect.

The present inventor also disclosed a novel method and apparatus for measuring pressures exerted on human feet or horses' hooves in U.S. Pat. No. 6,216,545, Apr. 17, 2001, *Piezoresistive Foot Pressure Measurement*. The novel apparatus disclosed in the '545 patent includes a rectangular array of piezoresistive force sensor elements encapsulated in a thin, flexible polymer package. Each sensor element includes a polymer fabric mesh impregnated with conductive particles suspended in an elastomeric matrix such as silicone rubber. The piezoresistive mesh layer is sandwiched between an array of row and column conductor strip laminations, preferably made of a nylon mesh impregnated with printed metallic paths. Each region of piezoresistive material sandwiched between a row conductor and column conductor comprises an individually addressable normal force or pressure sensor in a rectangular array of sensors, the resistance of which varies inversely in a predetermined way as a function of pressure exerted on it, and thus enabling the force or pressure distribution exerted by an object contacting the array to be mapped.

The present invention was conceived of to provide a pressure or force sensor array of simplified construction and few components, which has the form of highly flexible fabric-like lattice which facilitates conforming the sensor array to compoundly curved surfaces, thereby facilitating mapping force or pressure distributions on such surfaces.

OBJECTS OF THE INVENTION

An object of the present invention is to provide a two-dimensional sensor array for measuring forces exerted by an object on a surface at discrete points in a two-dimensional lattice, thereby enabling the distribution of pressure exerted by an object on a surface on which the sensor array is placed to be mapped.

Another object of the invention is to provide a two-dimensional pressure mapping sensor array which employs a lattice of elongated, intersecting piezoresistive threads.

Another object of the invention is to provide a two-dimensional pressure sensor array which includes a lattice of piezoresistive threads, intersecting regions of which form individual piezoresistive sensor elements.

Another object of the invention is to provide a piezoresistive force sensor array for measuring forces exerted by an object on discrete points of a surface on which the array is placed, thereby enabling mapping of pressure exerted on the surface by the object.

Another object of the invention is to provide a piezoresistive force sensor array which includes a lattice of intersecting piezoresistive threads, each thread having an electrically conductive core clad with a piezoresistive material, contacting regions of which piezoresistive threads form individual piezoresistive sensor elements, the electrical resistance of which varies inversely with externally applied pressure urging the intersecting threads together.

Another object of the invention is to provide a pressure sensor array having the form of a flexible fabric lattice which is readily conformable to a curved surface, the fabric lattice comprising intersecting piezoresistive resistive threads each consisting of a flexible wire core clad with a resiliently deformable piezoresistive material.

Another object of the invention is to provide a two-dimensional pressure sensor array for measuring the magnitude and location of forces exerted by an object on a surface on which the array is placed, the array comprising a fabric lattice made of intersecting piezoresistive threads, each of which includes a core made of a flexible electrically conductive wire clad with a piezoresistive elastomeric material.

Another object of the invention is to provide a piezoresistive pressure sensor array which comprises a fabric lattice made of interwoven warp and woof threads, each of which includes a flexible electrically conductive wire core wrapped with semi-conductive filaments made of a flexible fibrous material such as surface-carburized nylon fibers, intersecting regions of the warp and woof filaments forming a two-dimensional array of piezoresistive pressure sensor elements in which the surface electrical contact resistance between warp and woof strands is inversely proportional to an external force urging the intersecting strands together.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a two-dimensional array consisting of a lattice of individual force or pressure sensor elements comprising intersecting pairs of elongated, flexible strands or threads, each of which consists of a central electrically conductive wire core having a relatively low electrical resistivity, covered with a material having a relatively higher electrical resistivity. In one embodiment of the invention, each of a pair of flexible threads consists of a thin metal wire which is spirally wrapped with filaments made of nylon, the outer surface of each filament which has been carburized to make the surface electrically conductive. Preferably, the threads are arranged into two parallel planar sets; one set of threads forming parallel rows, and another set of threads forming parallel columns perpendicular to the rows. In one embodiment of the invention, row and column thread sets are arranged in two separate contacting planes, one on top of the other, to form a rectangular array. In another embodiment, the threads are interwoven into a mono-planar, rectangular array, or mesh. In both embodiments, a contacting region between each pair of crossed threads defines a lattice point and forms an electrical node of variable resistance. When the threads are urged together by a small force normal to the plane of the threads, a relatively small portion of the conductive filaments on the outer surfaces of the threads located at the node physically contact one another, thus resulting in a conductive path having a relatively large electrical resistance being formed at the node defined between the crossed threads. Increased pressure exerted on the planes of the threads forces larger portions of a greater percentage of the filaments into more intimate contact, thus decreasing the electrical resistance of the node by a surface piezoresistive effect, in a predetermined way as a function of applied pressure.

In another embodiment of the invention, each of the pair of flexible threads of a sensor element consists of a thin metal wire which is clad with a resilient piezoresistive material, preferably an elastomeric piezoresistive material such as silicone rubber filled with carbon black or carbon fibers. When such threads are urged together by a force normal to a tangent contact plane in which a pair of crossed threads physically contact one another to form a resistive node, the size of the intersecting contact surface area increases, thus decreasing the electrical resistance of the intersection node by a surface piezoresistive effect. Moreover, compression of the elastomeric piezoresistive cladding material decreases electrical resistance of the node by a bulk or volume piezoresistive effect.

In both embodiments of force sensor arrays using piezoresistive threads according to the present invention, electrical resistance at contacting intersections of threads decreases in a predetermined way with applied normal force, thus enabling quantitative measurements of that force by measuring the electrical resistance of the node, utilizing conventional means such as a wheatstone bridge circuit, in which a voltage is applied between a selected pair of row and column piezoresistive threads that intersect at the node.

In a preferred embodiment of the present invention, piezoresistive threads of the type described above are woven into fabric to form a sensor array having the form of a two-dimensional, rectangular lattice, each intersecting region of a warp and woof thread thereof which defines a variable resistance node comprising an individual piezoresistive sensor element of an array of such sensor elements. Addressing warp and woof threads as row and column conductors, respectively, of the sensor array by conventional electronic means, enables a two-dimensional plot of electrical resistance values at each node to be made, thus enabling a two-dimensional matrix or map of pressure values exerted on each of the lattice points of the sensor array to be generated.

BRIEF DESCRIPTION OF THE DRAWINGS

FIG. 4 is a fragmentary transverse sectional view of the sensor array of FIG. 1 or FIG. 3, on a further enlarged scale, in which

FIG. 6 is a fragmentary transverse sectional view of the sensor array of FIG. 5, on a further enlarged scale, in which

FIG. 7 is a graph showing electrical resistance plotted as a function of pressure exerted on sensor elements of the sensor array shown in FIGS. 1–4 or FIGS. 5 and 6.

DESCRIPTION OF THE PREFERRED EMBODIMENTS

Figure 1:
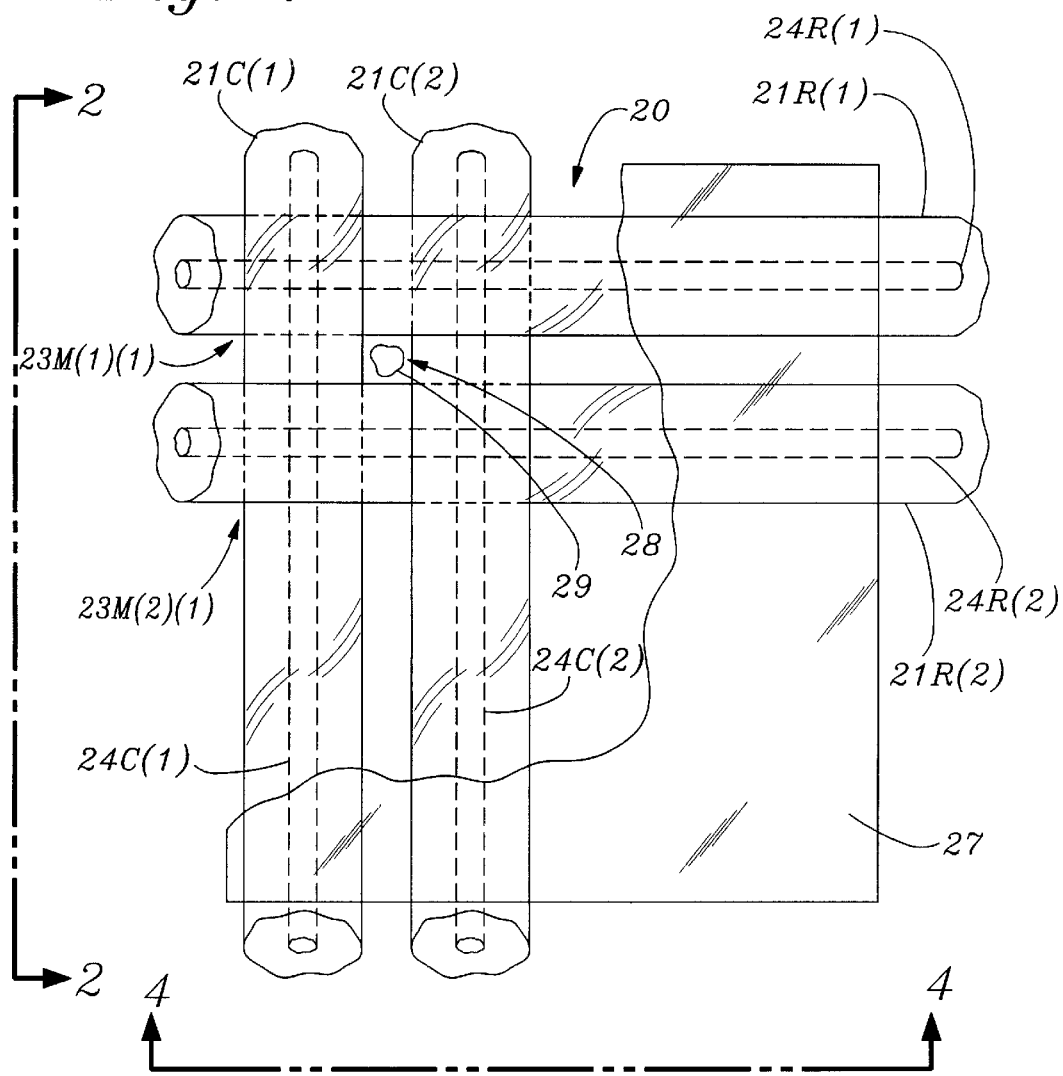
FIG. 1 is an upper plan view, on an enlarged scale, of a pressure measurement sensor array according to the present invention, comprising a non-woven fabric lattice of piezoresistive threads.
Figure 2:
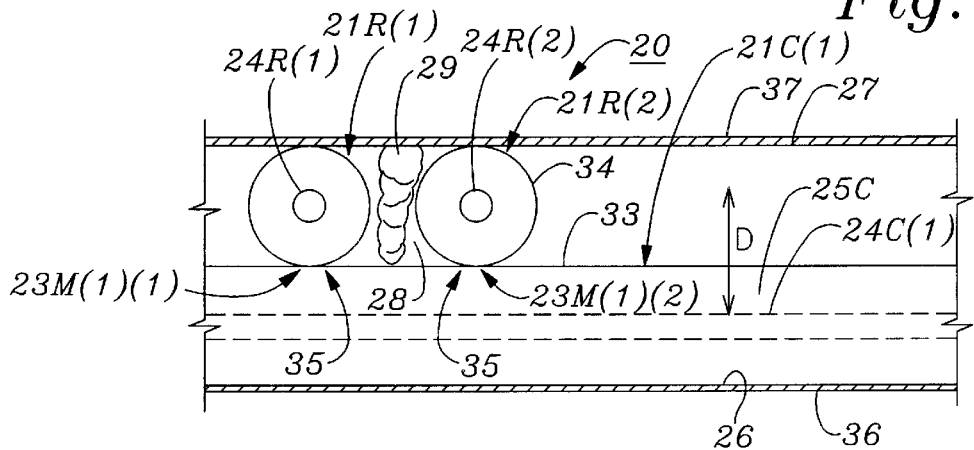
FIG. 2 is a transverse sectional view of the sensor array of FIG. 1, taken along line 2—2 and on a further enlarged scale.

FIGS. 1 and 2 illustrate a basic embodiment of a pressure measurement sensor array according to the present invention, which embodiment includes a non-woven fabric-like lattice of piezoresistive threads. As shown in FIGS. 1 and 2, a pressure measurement sensor array 20 according to the present invention includes at least one pair of elongated piezoresistive threads 21R, 21C which are disposed one on top the other. According to the invention, the longitudinal axes of each pair of piezoresistive threads 21R, 21C are inclined to one other at an angle, e.g., ninety degrees, to define a crossing point or lattice point. Thus, as shown in FIG. 1, threads 21R, 21C are arranged in rows and columns which are mutually perpendicular and spaced apart at equal intervals, thus forming a rectangular lattice 22 of crossing regions 23M(a)(b), where (a) defines a row and (b) defines a column of the lattice such as 23M(1)(1)) located at the upper left corner, or origin of the matrix, and 23M(2)(1), at the intersection of piezoresistive threads 21R2 and 21C1 of row 2 and column 1, respectively, of the lattice.

As shown in FIGS. 1 and 2, each row and column piezoresistive thread 21R, 21C is preferably of identical construction. Thus, each piezoresistive thread 21 includes an elongated, flexible core 24 made of a material having relatively high electrical conductivity. In an example embodiment of sensor array 20, conductive core 24 consists of a length of 32 gauge stainless steel wire.

According to the invention, the conductive core 24 of each piezoresistive thread 21 is clad with a layer 25 of material which has a different composition than that of conductive core 24, the cladding layer material being selected to provide a surface and/or volume piezoresistive characteristic. In an example embodiment of piezoresistive threads 21 according to the present invention, cladding layer 25 consisted of an elongated tubular jacket coaxial with central conducting core 24, and which was made from a conductive polymer. Preferably, the conductive polymer from which cladding layer 25 is made is an elastomer such as silicone rubber. The present inventor has found that a suitable material for piezoresistive cladding layer 25 is composed of about 50% milled carbon black having a grain size of 2–5 microns, which is thoroughly mixed with about 30% unpolymerized rubber, type BUNA N, and 20% ABS plastic resin/hardener, or silicone rubber (e.g., DOW CORNING RTV 732, obtainable from Neely Industries, 2704 West Pioneer Parkway, Arlington, Tex. 76013) and no hardener. Piezoresistive cladding layer 25 is formed by mixing the aforementioned components thoroughly into a thick slurry, extruding the slurry coaxially over a length of conductive core wire 24, and allowing the cladding layer to air cure at room temperature, thereby forming a tubular jacket bonded to the core wire.

The volume resistivity of cladding layer 25 of piezoresistive threads 21 can be adjusted to a desired value by varying the amount of carbon black added to the liquid rubber, and monitoring the resistance of the liquid mixture as these two components are being mixed together. The present inventor has found that a suitable range of volume resistivities for piezoresistive cladding layer 25 is about 50,000 ohm-cm to 100,000 ohm-cm for measurement of normal forces in the approximate range of 0–5 psi, and 100–300,000 ohm-cm for measurement of forces in the approximate range of 5–30 psi. In an example embodiment of sensor array 20 which was tested, each piezoresistive thread 21 consisted of a core 24 made of 28 gauge stainless steel clad with a coax)al layer 25 of silicone RTV 732, had a surface resistivity of 100 ohms/square, a volume resistivity of 100 ohm-cm, and a thickness of about 0.008 inch. Thus, each piezoresistive thread 21 had an outer diameter of about 0.075 inch.

Referring now to FIG. 2 in addition to FIG. 1, it may be seen that row and column piezoresistive threads 21R, 21C are held in fixed relative positions defining a rectangular lattice by encapsulating the threads between lower and upper laminations consisting of thin sheets of a flexible polymer. In an example embodiment of sensor array 20, lower and upper laminations 26 and 27 consisted of 0.002 inch thick sheets of polyurethane, which were adhered together at interstices 28 between row and column threads 21R, 21C by glue blobs 29 made of silicone RTV 732. As shown in FIG. 2, the aforementioned construction of sensor array 20, using lower and upper laminating sheets 26, 27 enables row and column piezoresistive strands 21R, 21C to lie entirely in separate, parallel, contacting planes, such as an upper plane 30 and a lower contacting plane 31. As shown in FIG. 2, column piezoresistive threads 21C are in upper plane 30, while row piezoresistive threads 21R are in lower plane 31. However, the sensor array 20 performs identically with column piezoresistive threads 21C located in lower plane 31, underlying upper plane 30.

Figure 3:
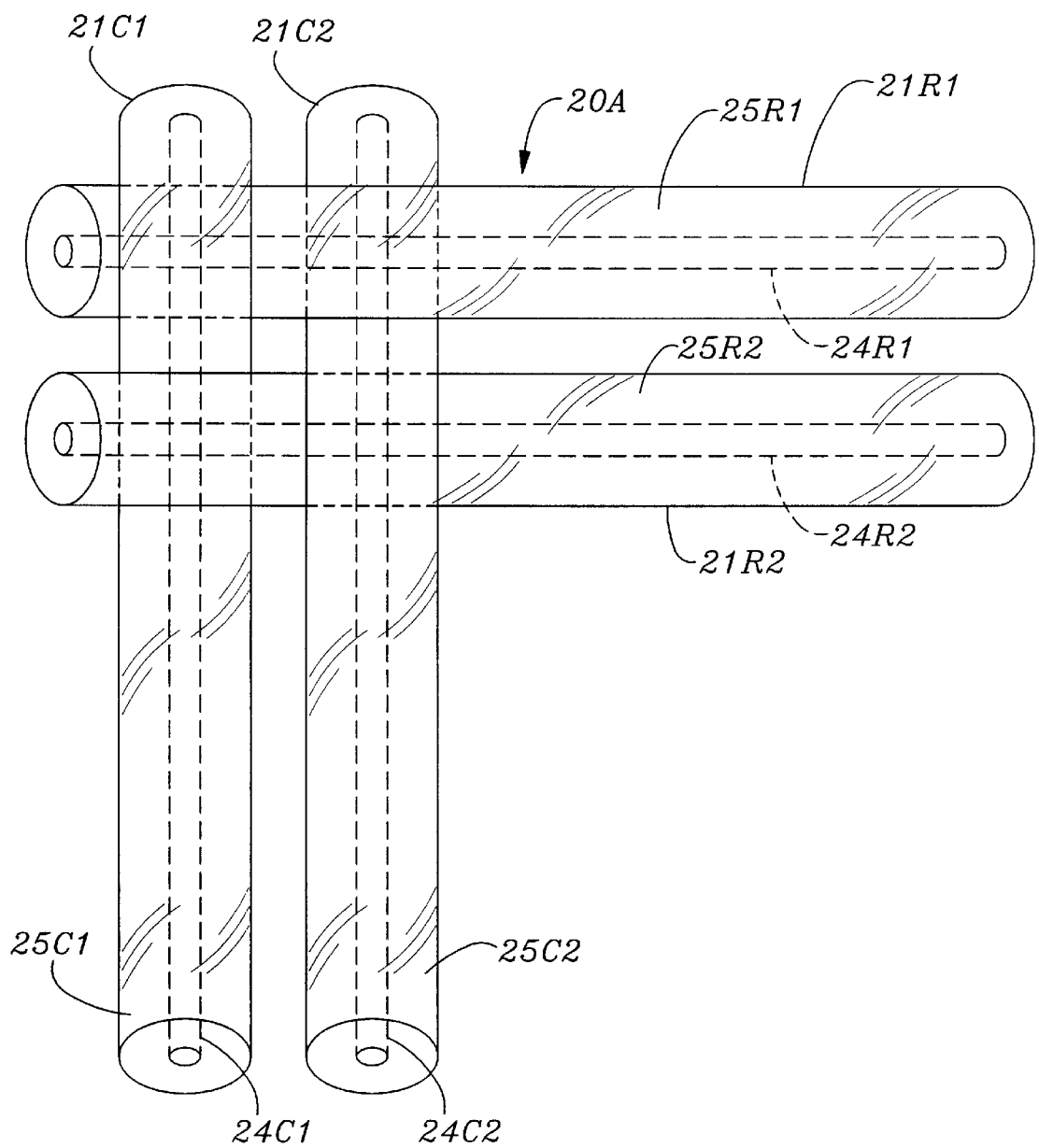
FIG. 3 is an upper plan view of a variation of the sensor array shown in FIG. 1, in which piezoresistive threads thereof are interwoven.

FIG. 3 illustrates a variation 20A of sensor array 20, in which row and column piezoresistive threads 21R, 21C are interwoven into a fabric mesh, rather than lying in separate planes. In this variation, piezoresistive threads 21R, 21C are held tightly together in a planar lattice, without requiring that either or both of row and column threads be adhered to or sandwiched between laminations. Thus, this variation dispenses with a requirement for lower and upper sheet laminations 26, 27, as well as glue blobs 29.

FIG. 4 illustrates how the arrangement of row and column piezoresistive threads 21R, 21C, as shown in FIGS. 1–3, forms individual force sensing elements 32 located at each crossing region or intersection 23M(a)(b) between a row piezoresistive thread 21R and a column piezoresistive thread 21C. Thus, as shown in FIGS. 2 and 4, with no external force applied to sensor array 20, each crossover region or lattice point 23 of the sensor array has thereat a piezoresistive row thread 21R, the cladding layer 25R of which has an outer longitudinally disposed cylindrical surface 33 that contacts an outer cylindrical surface 34 of cladding layer 25C of a column thread 21C at a contact area 35 in a plane tangent to the two contacting surfaces. Tangent contact area 35 provides electrically conductive continuity between row and column conductors 24R, 24C of piezoresistive threads 21R, 21C.

With no external force applied to sensor array 20, the electrical resistance of contact area 35 is relatively high since the volume resistivity of cladding layers 25 is relatively high, the surface resistivity of contacting surfaces 33 and 34 is relatively high, and the area of tangent contact area 35 is relatively small. However, as shown in FIGS. 4B and 4C, when a normal force N of increasing magnitude is applied to sensor array 20, the electrical conductance of a tangent contact area 35 between a row and column piezoresistive thread pair 21R, 21C decreases, in a manner which will now be described.

Figure 4A:
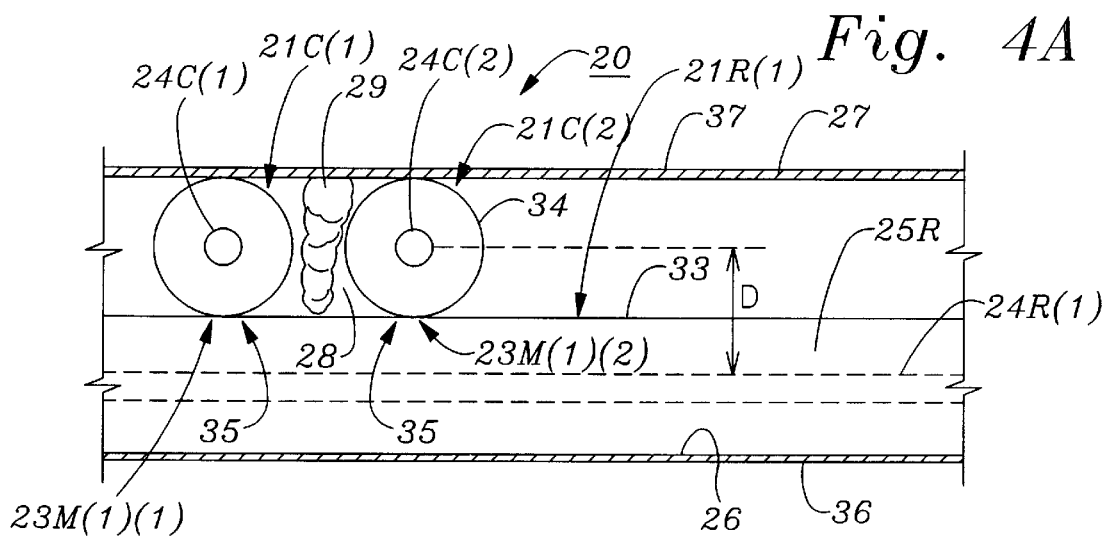
FIG. 4A shows the disposition of a pair of piezoresistive threads intersecting to form a force sensing element, with no external force applied to the element.

Referring first to FIGS. 2 and 4A, it may be seen that with no external force applied to sensor array 20, tangent contact area 35 between a row thread 21R and column thread 21C is relatively small, since contacting cylindrical outer surfaces 33 and 34 of the cladding layers 25 of the threads which touch one another at contact area 35 both have circular cross sections. Under these circumstances, the small size of contact area 35 results in a relatively high electrical resistance. Moreover, with row and column threads 21R, 21C having undeformed circular cross sections, the radial distance through resistive cladding layers between row and column central conductive cores 24R, 24L is at a maximum, maximizing the total resistance measurable between the two central conductive wire cores.

Figure 4B:
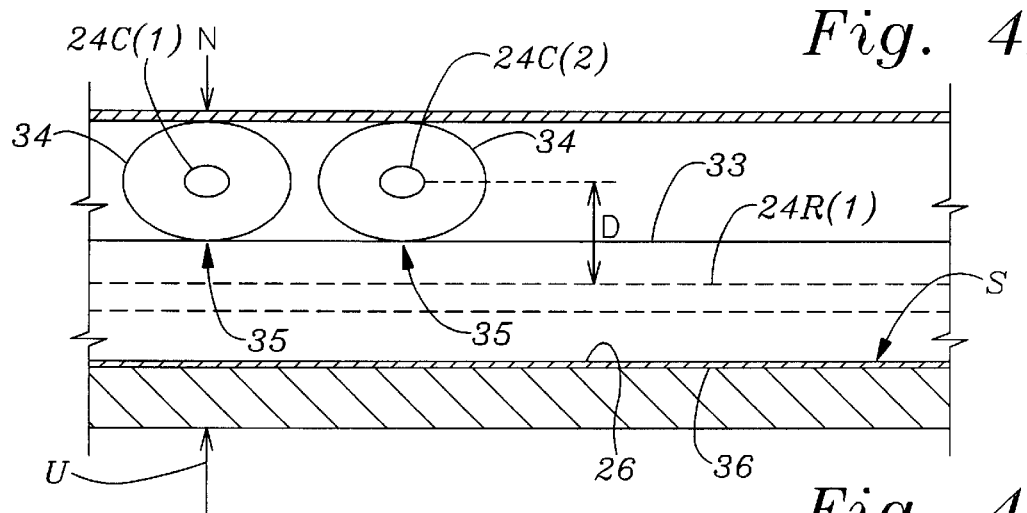
FIG. 4B shows the sensor element of FIG. 4A with a moderate external normal force applied thereto.
Figure 4C:
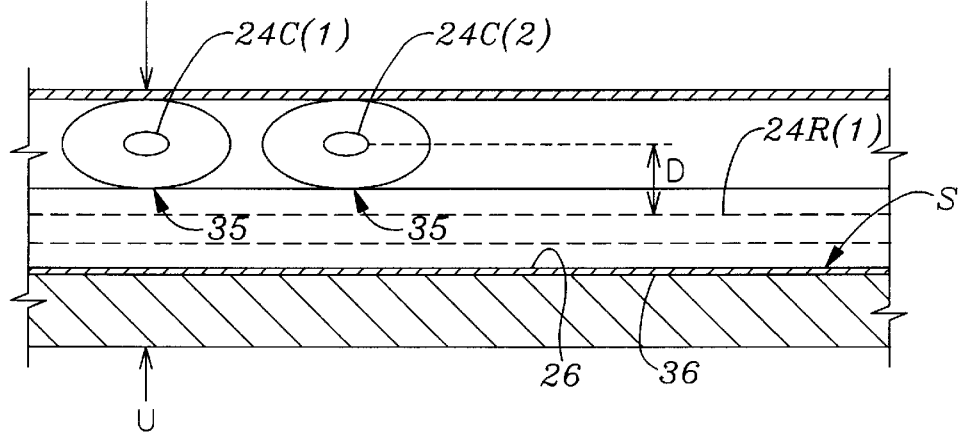
FIG. 4C shows the sensor element with a larger external force applied thereto.

FIGS. 4B and 4C illustrate effects of external normal forces or pressures exerted on sensor array 20. As shown in FIGS. 4B and 4C, sensor array 20 is placed with its lower surface 36 supported on a surface S and a force N exerted perpendicularly downwards on upper surface 37 of the array, resulting in a reaction force U being exerted upwardly by supporting surface S on lower surface 36 of the array. Since cladding layers 25R, 25C of row and column piezoresistive threads 21R, 21C are made of a resiliently deformable material, force pair N-U causes the circular cross sectional shapes of the cladding layers of the piezoresistive threads to deform from circles to ovals elongated in a plane perpendicular to the direction of force pair N-U, i.e., horizontally in FIG. 4. That deformation causes tangent contact area 35 to increase and the radial distance D between conductive wires 24R, 24L to decrease, both of which variations cause the electrical resistance R measurable between the conductive cores to decrease.

For moderate values of normal force N, as shown in FIG. 4B, resilient deformation of piezoresistive threads 21R, 21C is relatively small, resulting in a relatively small reduction in electrical resistance R between the threads. Larger forces N exerted on sensor array 20 cause larger deformations of the piezoresistive threads, as shown in FIG. 4C, resulting in larger percentage reductions in resistance R. FIG. 7 illustrates in a general way the reduction in electrical resistance measurable between a pair of row and column piezoresistive threads 21R, 21C at an intersecting point 28, as a function of normal force or pressure exerted on sensor array 20 at that point.

Figure 5A:
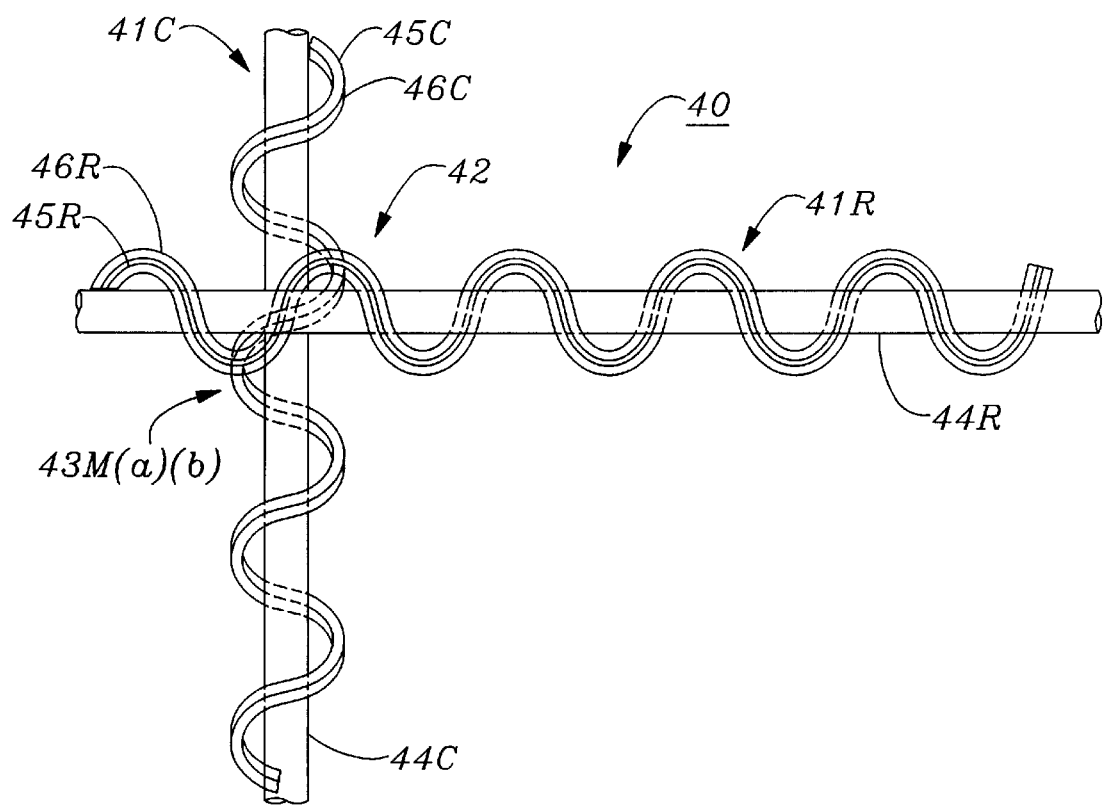
FIG. 5 is a fragmentary upper plan view on an enlarged scale of another embodiment of a piezoresistive pressure measurement sensor array according to the present invention, which utilizes piezoresistive threads that include a conductive wire core which is sheathed with a plurality of filaments of a material which has a lower electrical conductivity than the core.
Figure 5B:
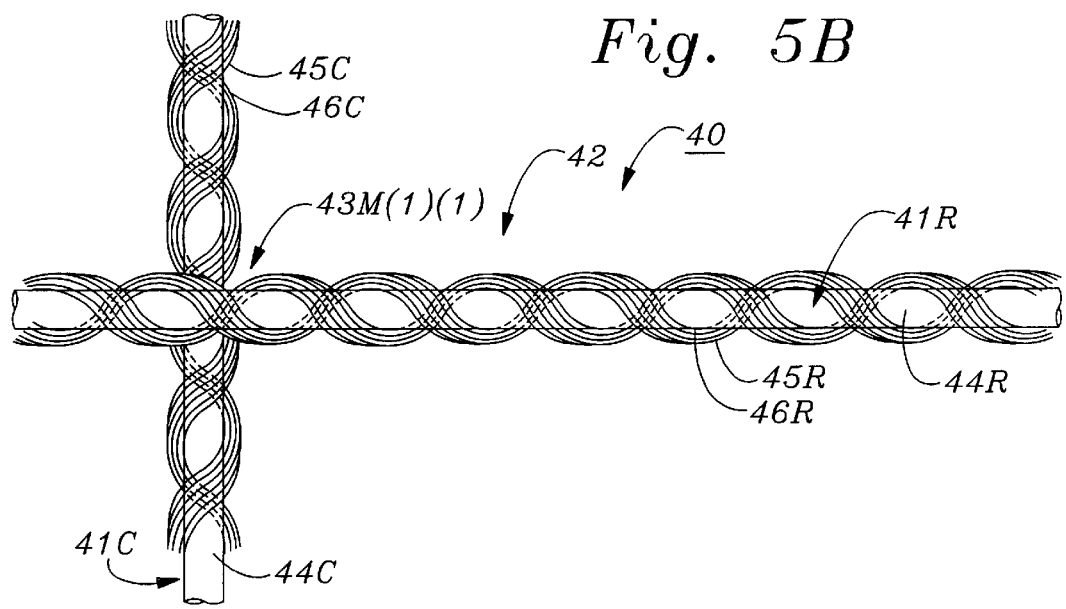

FIGS. 5 and 6 illustrate another embodiment of a piezoresistive pressure measurement sensor array according to the present invention. That embodiment utilizes piezoresistive threads which each include a conductive wire core which is covered by a sheath made of a plurality of strands of a material which has a lower electrical conductivity than the core.

As shown in FIGS. 5 and 6, a pressure measurement sensor array 40 according to the present invention includes at least one pair of elongated piezoresistive threads, including a row thread 42R and column thread 41C which are disposed one on top of the other. As shown in FIG. 5, the longitudinal axes of row and column threads 41R, 41C are angled with respect to one another, e.g., at ninety degrees, and are spaced apart at equal intervals to thereby form a rectangular lattice 42 of crossing regions 43M(a)(b), where index letter (a) defines a row and index letter (b) defines a column of the lattice. For example, crossing region or lattice point 43M(1)(1) is located at the upper left corner or origin of lattice 42, and lattice pair 43M(2)(1) is located at the intersection of piezoresistive threads 21R2 and 21C1 of row 2 and column 1, respectively, of the lattice.

As shown in FIGS. 5 and 6, each row and column piezoresistive thread 41R, 41C is preferably of identical construction. Thus, each piezoresistive tread 41 includes an elongated, flexible core 48 made of a material having a relatively high electrical conductivity. In an example embodiment of sensor array 40, the conductive core consists of a length of 40-gauge stainless steel wire.

According to the invention, conductive core 44 of each piezoresistive thread 41 is sheathed with at least one and preferably a plurality of elongated flexible filaments, e.g., a pair 45–46, made of a material which has a higher electrical resistivity than that of conductive wire core 44. As shown in FIG. 5, filaments 45, 46 are each wrapped around each core 44R, 44C to form a tight helical spiral around the core. Preferably, each filament 45, 46 is wrapped parallel to and in contact with each adjacent filament, at the same pitch, thus forming a relatively void-free covering of core 44. For ease of illustration, only two such filaments 45, 46 are shown wrapped around core. However, the preferred number of individual fibers 45 spirally wrapped around each core wire 44 is more than two, e.g., 20.

As mentioned above, wrapping filaments 45, 46 are made of a material which has poorer electrical conductivity than conductive wire core 44, in an example embodiment of piezoresistive threads 41 according to the present invention, filaments 45 consists of 20 strands of 0.001 inch diameter nylon having an electrically conductive surface, braided Into elongated sheaths having a diameter of about 0.025 inch and a linear resistivity of 30,000 ohms/foot.

The example embodiment utilized nylon filaments which had outer surfaces that were carburized to make them electrically conductive, and were obtained from the Saunders Thread Company, Gastonia, N.C. 28054-0020. The carburized nylon filaments were formed into two bundles each consisting of 10 strands, and spiral wrapped in opposite directions in parallel, adjacent helices around a 40 gauge stainless steel core wire. Although this arrangement worked reasonably well, bare spots of core wire not covered by filaments on adjacent row and column threads could possibly contact one another and create a low resistance connection, or electrical short between a row and column thread pair. Accordingly, it was found (or believed to be desirable) to use at least 3 or preferably 4 different bundles of carburized filaments wrapped in adjacent spiral helixes around a stainless steel core wire. Each adjacent spiral helix is preferably wrapped in a direction opposite to its neighbor, e.g., clockwise, counter-clockwise, or right-handed, left-handed, etc. Also, it was found that using stainless steel core wires smaller than 40-gauge resulted in a sensor array lattice of greater flexibility. Preferably in this case, at least 2 and preferably 3 adjacent stainless steel wires of smaller diameter than 40 gauge were used to provide redundancy to help ensure operability of the sensor array even if a conductive core wire were broken.

Spiral wrapped piezoresistive threads 41 may be held in fixed positions relative to one another to form a rectangular sensor lattice in the exact same manner as described above for sensor embodiment 20 employing clad conductive cores. Thus, piezoresistive threads 41 may be encapsulated in the manner as shown in FIG. 1, or interwoven into a fabric mesh in the manner shown in FIG. 3, both of which constructions are described above.

Figure 6A:
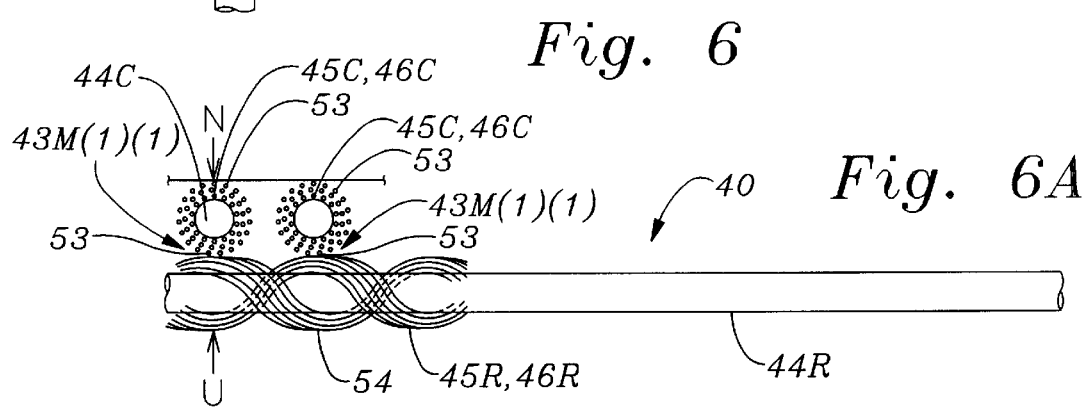
FIG. 6A shows the disposition of a pair of piezoresistive threads intersecting to form a force sensing element, with no external force applied to the element.
Figure 6B:
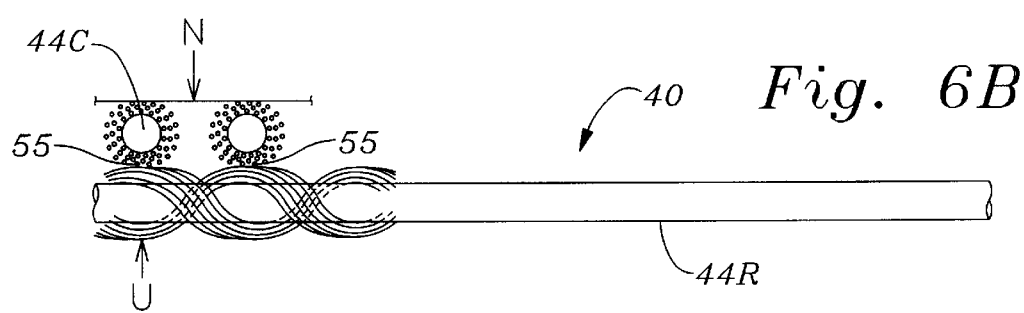
FIG. 6B shows the sensor element of FIG. 6A with a moderate external normal force applied thereto.
Figure 6C:
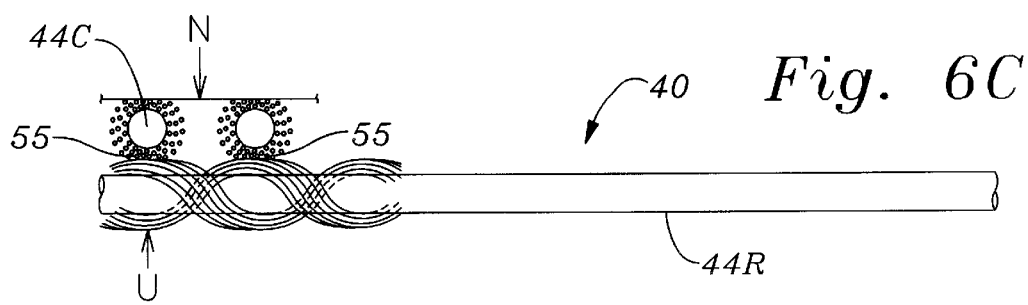
FIG. 6C shows the sensor element with a larger external force applied thereto.

FIG. 6 illustrates how the arrangement of row and column piezoresistive threads 41R, 41C forms individual sensing elements 52 located at crossing regions or intersections 43M (a)(b) of a row piezoresistive thread 41R with a column resistive thread 41C. Thus, as shown in FIG. 6A, with no external force applied to sensor array 40, each cross-over region or lattice point 43 of the sensor array has thereat at feast one of the resistive filaments 45R, 46R wrapped around a core 44 of a row piezoresistive thread 41R in electrically conductive contact with at least one of the filaments 45C, 46C wrapped around a core 44C of a column piezoresistive thread 41C. The outer surfaces 53, 54 of filaments 45R, 45C contact each other at tangent contact regions 55 which provide electrically conductive continuity between row and column conductors 24R, 24C of piezoresistive threads 41R, 41C. With no external force applied to sensor array 40, the electrical resistance of contact area 35 is relatively high, since each tangent contact area 55 is relatively small under these circumstances. However, as shown in FIGS. 6B and 6C, when a normal force of increasing magnitude is applied to sensor array 40, the electrical conductance of tangent contact area 55 between row and column filaments 45R, 46R, 45C, 46C of row and column piezoresistive threads 41R, 41C decreases, as will now be described.

Referring to FIGS. 5 and 6, it may be seen that with no external force applied to sensor array 40, tangent contact area 55 between a row thread filament 45R and column thread filament 45C is relatively small. Under these circumstances, the small size of contact area 55 results in a relatively high electrical resistance R measurable by applying a voltage between a row conductor 44R and column conductor 44C.

FIGS. 6B and 6C illustrate effects of external normal forces or pressures being exerted on sensor array 40. As shown in FIGS. 6B and 6C, sensor array 40 is placed with its lower surface 56 supported on a surface S, and a force N exerted perpendicularly downwards on upper surface 57 of the array, resulting in a reaction force U being exerted upwardly by support surface S on lower surface 56 of the array. With no external force applied to sensor array 40, conductive filaments 45, 46 of respective row and column filament bundles intermingle only slightly, resulting in a relatively high electrical resistance R between a row and column thread pair. However, as shown in FIGS. 6B and 6C, force pair N-U cause conductive filaments of row and column threads to intermingle more intimately, thereby causing the size of contact areas 55 between pairs of contacting filaments 45R, 46R, 45C, 46C to increase, thus decreasing surface resistance between the crossed filaments, and thereby causing the electrical resistance R measurable between conducting cores 44R, 44C to decrease.

For moderate values of normal force N, as shown in FIG. 6B, increase in contact areas 55 between row and column filaments 45R, 46R, 45C, 46C is relatively small, resulting in a relatively small reduction in electrical resistance R between piezoresistive threads 41R, 41C Larger forces N exerted on sensor array 40 cause larger increases in the size of contact areas 55, resulting in a larger percentage reduction in resistance R. FIG. 6 illustrates in a general way the reduction in electrical resistance R between a pair of row and column piezoresistive threads 41R, 41C at an intersecting lattice point 48, as a function of normal force or pressure exerted on sensor array 40 at that point.

Figure 8:
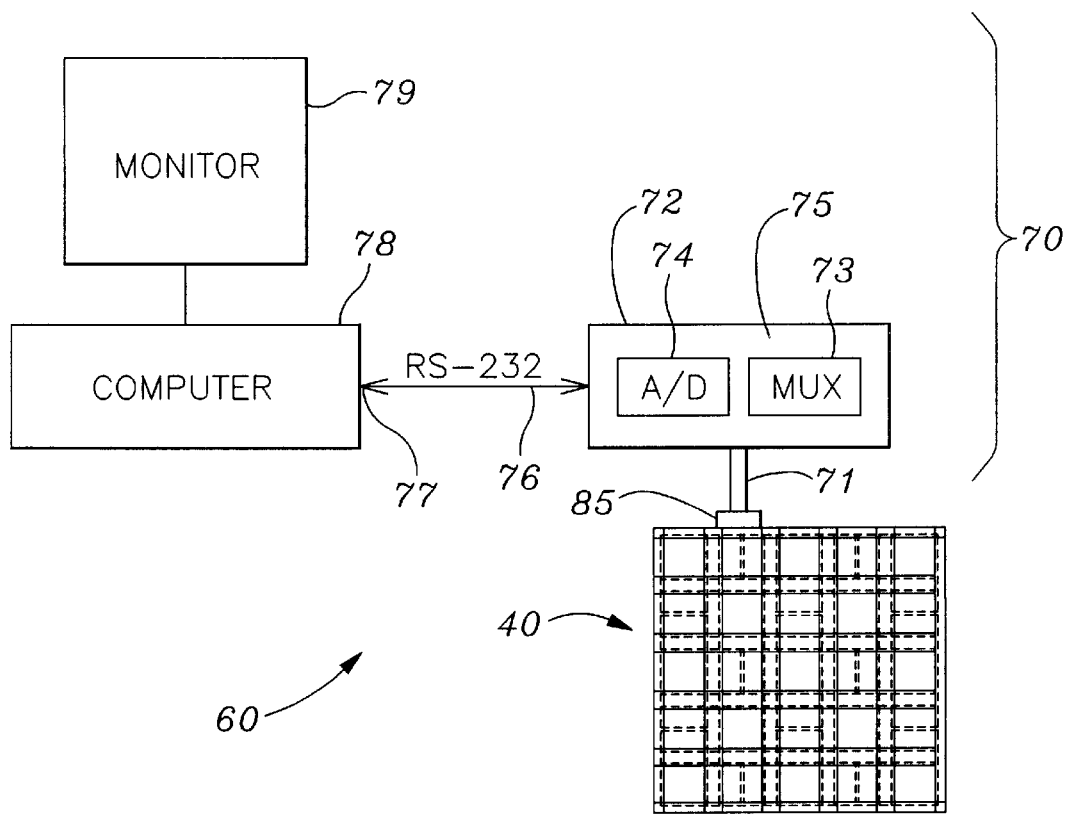
FIG. 8 is a partially diagrammatic block diagram showing the sensor array of FIGS. 1–4 or 5–6 interconnected with signal processing and display circuitry.

FIG. 8 is a partially diagrammatic view showing a pressure measuring and mapping apparatus 60 according to the present invention. As shown in FIG. 8, apparatus 60 includes a pressure sensor array 20 or 40 comprised of a lattice array of force sensor elements 32 of the type described above, and associated signal processing and display circuitry 70.

As shown in FIG. 8, pressure measuring and mapping apparatus 60 according to the present invention includes an interface cable 71 connected at one end thereof by a connector 85 to a sensor array 20 or 40. The other end of interface cable 71 is connected to an interface module 72 which provides means for applying electrical sampling signals between a selected column sensor thread 21C or 41C, and a selected row sensor thread 21R, 41R, to measure the electrical resistance R of a selected sensor element 32. Resistance is measured by applying a known voltage across a sensor resistance element 32, and measuring the resulting current, or applying a known current, and measuring the voltage drop across the element. Although a d.c. sampling signal can be used for measuring resistance of sensor elements 32, preferably, an a.c. signal is used, to avoid potential polarizing effects on the sensor elements.

Interface module 72 preferably contains a multiplexer 73, which sequentially outputs a sequence of m×n signals, each signal being representative of the resistance value for a particular sensor element 32 at the intersection of the mth row thread with the nth column thread. Also in the preferred embodiment, an analog-to-digital converter (ADC) 74 is connected between an analog resistance measuring circuit 75 and multiplexer 73, which is then of the digital variety, outputs a serial digital data signal on an RS232 port 76. In the preferred embodiment, RS232 port 76 of interface module 72 is connected to serial data port 77 of a computer 78.

Computer 78 is used to control interface module 72, directing the sequence of addressing sensors 32 in array 20 or 40. Computer 78 also performs signal processing functions, using predetermined scaling factors to convert the resistance values of sensor elements 32 to digital values representing normal forces and pressures exerted on the sensors. In the preferred embodiment, a two dimensional matrix of digital numbers representing the pressures on each of the m×n sensors 30 in array 40 is utilized to produce area maps of those pressures, which are displayed on a monitor 79 and stored in digital memory if desired.

What is claimed is:

1. A force sensing transducer for measuring external force exerted thereon, said transducer comprising;
   d. at least a first, elongated flexible, electrically conductive thread, said thread having an elongated outer circumferential surface circumscribed by a first layer of piezoresistive material,
   e. at least a second, elongated flexible, electrically conductive thread, said thread having an elongated outer circumferential surface circumscribed by a second layer of piezoresistive material and,
   f. means for positioning said first and second threads with selected portions of said first and second piezoresistive layers in a mutually contactable relationship, whereby said external force is effective in pressing together said first and second piezoresistive layers together to thereby form a piezoresistive junction for arbitrary orientations and axial rotations of said first and second threads relative to one another, said junction having an electrical resistance which varies inversely in a predetermined way as a function of said external force.

2. The force sensing transducer of claim 1 wherein at least one of said threads is further defined as including in combination an elongated electrically conductive core having on its outer surface at least at said piezoresistive junction a layer of piezoresistive material, said material having an electrical resistance which varies inversely in a predetermined way with force tending to press said first and second threads together at said piezoresistive junction.

3. The force sensing transducer of claim 2 wherein said layer of piezoresistive material is further defined as being formed into a jacket which overlies said conductive core.

4. The force sensor transducer of claim 3 wherein said piezoresistive material is further defined as being a resilient, electrically conductive polymer.

5. The force sensing transducer of claim 3 wherein said piezoresistive material is further defined as being an electrically conductive elastomer.

6. The force sensing transducer of claim 5 wherein said electrically conductive elastomer is further defined as being a silicone rubber filled with carbon particles.

7. The force sensing transducer of claim 2 wherein said layer of piezoresistive material is further defined as comprising at least a first elongated flexible filament which is wrapped around said conductive core, said filament having an electrical conductance less than that of said conductive core.

8. The force sensing transducer of claim 2 wherein said layer of piezoresistive material is further defined as being a sheath made of at least one filament which is wrapped around said conductive core, said filament being made of a material which has less electrical conductance than that of said conductive core.

9. The force sensing transducer of claim 8 wherein said filament is further defined as being a thin polymer thread having an outer surface which is processed to render said outer surface electrically conductive.

10. The force sensing transducer of claim 2 wherein said layer of piezoresistive material is further defined as comprising a plurality of elongated resistive filaments made of a material having an electrical conductivity less than that of said conductive core, said filaments being gathered into at least a first bundle and wrapped around said conductive core.

11. The force sensing transducer of claim 10 wherein said bundle of resistive filaments is wrapped in a spiral helix around said conductive core.

12. The force sensing transducer of claim 2 wherein said layer of piezoresistive material is further defined as comprising a plurality of bundles of resistive filaments made of a material having an electrical conductivity less than that of said conductive core, said bundles covering said conductive core.

13. The force sensing transducer of claim 12 wherein said plurality of bundles of resistive filaments are helically spiraled around said conductive core.

14. The force sensing transducer of claim 13 wherein at least one of said helical spirals has a handedness different than that of another of said helical spirals.

15. The force sensing transducer of claim 12 wherein said plurality of bundles of resistive filaments are woven or braided into an elongated tubular sheath which coaxially overlies said conductive core.

16. A force sensing transducer array for measuring external force exerted thereon, said array comprising;
a. a first plurality of elongated, spaced apart, flexible, electrically conductive row threads, each of said row threads having an elongated outer circumferential surface circumscribed by a first layer of piezoresistive material,
b. a second plurality of elongated, spaced apart, flexible electrically conductive column threads angled with respect to said row threads, each of said column threads having an elongated outer circumferential surface circumscribed by a second layer of piezoresistive material, and
c. means for positioning said row and column threads with selected portions of said first and second piezoresistive layers in a mutually contactable relationship, at a plurality of contact locations, whereby said external force is effective in pressing together said first and second piezoresistive layers together to thereby form at each of said contact locations piezoresistive junctions at arbitrary orientations and axial rotations of said row and column threads relative to one another, each of said junctions having an electrical resistance which varies inversely in a predetermined way as a function of said external force.

17. The sensor array of claim 16 wherein said row threads are arranged in a first, row plane.

18. The sensor array of claim 17 wherein said column threads are arranged in a second, column plane parallel to said row plane.

19. The sensor array of claim 18 wherein each of said piezoresistive junctions is further defined as comprising in combination a layer of piezoresistive material on an elongated electrically conductive core of at least one of said row and column conductive threads, said material having an electrical resistance which varies inversely in a predetermined way with external forces tending to press said piezoresistive material between a row and column thread.

20. The sensor array of claim 19 wherein said layer of piezoresistive material is further defined as being formed into a jacket which overlies said conductive core.

21. The sensor array of claim 20 wherein said piezoresistive material is further defined as being a resilient, electrically conductive polymer.

22. The sensor array of claim 20 wherein said piezoresistive material is further defined as being an electrically conductive elastomer.

23. The sensor array of claim 21 wherein said electrically conductive elastomer is further defined as being a silicone rubber filled with carbon particles.

24. The sensor array of claim 19 wherein said layer of piezoresistive material is further defined as comprising at least a first elongated flexible filament which is wrapped around said conductive core, said filament having an electrical conductance less than that of said conductive core.

25. The sensor array of claim 19 wherein said layer of piezoresistive material is further defined as being a sheath made of at least one filament which is wrapped around said conductive core, said filament being made of a material which has less electrical conductance than that of said conductive core.

26. The sensor array of claim 25 wherein said filament is further defined as being a thin polymer thread having an outer surface which is processed to render said outer surface electrically conductive.

27. The sensor array of claim 19 wherein said layer of piezoresistive material is further defined as comprising a plurality of elongated resistive filaments made of a material having an electrical conductivity less than that of said conductive core, said filaments being gathered into at least a first bundle and wrapped around said conductive core.

28. The sensor array of claim 27 wherein said bundle of resistive filaments is wrapped in a spiral helix around said conductive core.

29. The sensor array of claim 19 wherein said layer of piezoresistive material is further defined as comprising a plurality of bundles of resistive filaments made of a material having an electrical conductivity less than that of said conductive core, said bundles covering said conductive core.

30. The sensor array of claim 29 wherein said plurality of bundles of resistive filaments are helically spiraled around said conductive core.

31. The sensor array of claim 30 wherein at least one of said helical spirals has a handedness different than that of another of said helical spirals.

32. The sensor array of claim 29 wherein said plurality of bundles of resistive filaments are woven or braided into an elongated tubular sheath which coaxially overlies said conductive core.

33. A force sensing transducer array for measuring forces exerted on a surface, said array comprising;
a. a first plurality of elongated, flexible piezoresistive row threads disposed parallel to one another in a spaced apart disposition, each of said row threads comprising an elongated electrically conductive core having an outer circumferential surface circumscribed by a layer of piezoresistive material, said material having an electrical resistance which varies inversely in a predetermined way with force tending to compress said piezoresistive material,
b. a second plurality of column piezoresistive threads disposed parallel to one another and angled with respect to said row piezoresistive threads, each of said column piezoresistive threads comprising an elongated electrically conductive core having an outer circumferential surface circumscribed by a second layer of piezoresistive material, said material having an electrical resistance which varies inversely in a predetermined way with force tending to compress said piezoresistive material, and c. retention means for holding said row and column piezoresistive threads angled with respect to one another to form a lattice of piezoresistive junctions at each of which said first piezoresistive layer of said second row thread contacts said second piezoresistive layer of a column thread, said junctions being formed independently of axial rotation angle of said row threads relative to said column threads, and axial rotation angles of a said column thereof relative to said row threads.

34. The force sensing transducer array of claim 33 wherein said retention means comprises in combination at least a first, lower lamination and bonding means bonding said piezoresistive threads thereto.

35. The force sensing transducer array of claim 34 further including a second, upper lamination which with said first lamination covers first and second outer sides of said piezoresistive threads.

36. The force sensing transducer of claim 33 wherein said retention means is further described as comprising interweaving of said row and column threads to thereby form a fabric mesh.

37. A force sensing transducer which has an electrical resistance that varies in a predetermined way as a function of force exerted thereon, said transducer comprising;

a. at least a first, elongated flexible electrically conductive thread, b. at least a second, elongated flexible electrically conductive thread, and c. at least one of said first and second threads including in combination an elongated electrically conductive core having on an outer surface thereof a layer of piezoresistive material, said material having an electrical resistance which varies inversely in a predetermined way with force exerted thereon, said material electrically conductively contacting another of said first and second threads at a contact region to form thereat a piezoresistive junction, said layer of piezoresistive material comprising a plurality of elongated resistive filaments made of a material having an electrical conductivity less than that of said conductive core, said filaments being gathered into at least a first bundle and wrapped around said conductive core in a spiral helix.

38. The force sensing transducer of claim 37 wherein said layer of piezoresistive material is further defined as a plurality of bundles including at least said first bundle and a second bundle of elongated resistive filaments wrapped around said conductive core in a spiral helix.

39. The force sensing transducer of claim 38 wherein said spiral helix of said second bundle of resistive filaments is further defined as having a chirality different than the chirality of said spiral helix of said first bundle of said resistive filaments.

40. A force sensing transducer array for measuring forces exerted on a surface, said array comprising;

a. a first plurality of elongated, spaced apart, parallel, flexible electrically conductive row threads arranged in a first, row plane, b. a second plurality of elongated, spaced apart, parallel, flexible electrically conductive column threads angled with respect to said row threads, said column threads arranged in a second, column plane parallel to said row plane, at least one of said row and column conductive threads including in combination an electrically conductive core having on an outer surface thereof a layer of piezoresistive material, said material having an electrical resistance which varies inversely in a predetermined way with force exerted thereon, said material electrically conductively contacting at least one of said column and row conductive threads at a plurality of contact regions to form thereat a plurality of piezoresistive junctions, said layer of piezoresistive material comprising a plurality of elongated resistive filaments made of a material having an electrical conductivity less than that of said conductive core, said filaments being gathered into at least a first bundle and wrapped around said conductive core in a spiral helix.

41. The force sensing transducer array of claim 40 wherein said layer of piezoresistive material is further defined as a plurality of bundles including at least said first bundle and a second bundle of elongated resistive filaments wrapped around said conductive core in a spiral helix.

42. The force sensing transducer of claim 41 wherein said spiral helix of said second bundle of resistive filaments is further defined as having a chirality different than the chirality of said spiral helix of said first bundle of said resistive filaments.

43. The force sensing transducer array of claim 41 wherein said plurality of bundles is further defined as being woven or braided into an elongated tubular sheath which overlies said conductive core.

* * * * *